United States Patent [19]

Fabris

[11] Patent Number: 5,700,233
[45] Date of Patent: Dec. 23, 1997

[54] SLEEVELESS CANTILEVER DRIVE FOR HIGH TORQUE APPLICATIONS

[76] Inventor: Mario Fabris, 188 North Service Road, Grimsby, Ontario, Canada, L3M 4E8

[21] Appl. No.: 562,743

[22] Filed: Nov. 27, 1995

[51] Int. Cl.[6] .................................................. B21B 27/03
[52] U.S. Cl. ........................................... 492/1; 492/4
[58] Field of Search ........................... 29/895.1, 402.03, 29/402.04; 492/1, 4

[56] References Cited

U.S. PATENT DOCUMENTS

| | | | |
|---|---|---|---|
| 3,825,167 | 7/1974 | Komorek et al. | 279/4.11 |
| 4,386,566 | 6/1983 | Moss | 492/4 |
| 4,741,250 | 5/1988 | Weyer | 92/33 |
| 4,838,103 | 6/1989 | Weyer | 74/89.15 |
| 4,846,007 | 7/1989 | Weyer | 74/89.15 |

*Primary Examiner*—Larry I. Schwartz
*Assistant Examiner*—Marc W. Butler
*Attorney, Agent, or Firm*—Edward H. Oldham

[57] ABSTRACT

Apparatus for mounting a mill roll on a mill drive shaft in which mounting concentricity is produced by the internal expansion of the drive shaft to engage the bore of the mill roll. A secondary clamping device provides additional lateral binding force on the mill roll necessary for the production of the required frictional forces for the transmission of driving torque from the shaft to the mill roll.

10 Claims, 5 Drawing Sheets

SLEEVELESS CANTILEVER DRIVE FOR HIGH TORQUE APPLICATIONS

In many industries, long products are obtained by passing the work product, i.e. a strand of copper, steel or other materials, between a pair of opposing rollers in a mill stand which are spaced apart by a specified gap, and contoured to some predetermined shape, and driven at a speed to pass the work product on to the next pair of rollers at an exit velocity which will be determined by the entrance velocity of the material undergoing reduction and the degree of reduction undergone by material passing between the rollers.

The rollers for each of the shaping and reducing stands must meet some very demanding specifications in order to produce a final shape within the tolerances set by the customer. For instance, the surface contours of each pair of mill rolls must have an accurately matched profile to produce a predetermined cross section of the work product being squeezed and deformed by the pair of rolls. The rolls must not separate unduly due to the separating force produced by the work product passing between the opposing work rolls or an unacceptable change in cross section of the finished product causes rejection of the product by the customer. The resulting bending moment on each of the cantilevered (capstan) shafts is substantial during a rolling and forming operation, thus each cantilevered shaft must be robust enough to resist undue deflection when loaded.

The opposing rolls must also rotate concentrically on the shaft on which they are mounted so as to be true during rotation. Eccentricity of either or both of the work rolls during operating is to be avoided due to the cyclic aberrations produced in the work product cross section during passage between a pair of rolls which rotate eccentrically. Roll eccentricity usually results during a roll replacement operation at a mill stand due to error accumulation of inaccurate components.

Because of the exacting demands made by purchasers of the ultimate product produced by such a forming and rolling operation, and because of the complex nature of the many reforming operations required to take a billet to a wire, for instance, mill operators have faced the above problems on a daily basis because the rolls which perform the reforming and shaping operations although very tough and extremely hard, still experience wear during operation and must be frequently replaced.

A modern wire and rod mill may have as many as 20–30 mill stands operating in tandem to bring a billet down to its ultimate shape and if the rolls on a mill stand require frequent replacement, much productive mill time is lost if the roll replacement cannot be performed expeditiously. It is to overcome some of the deficiencies in the prior art roller mounting devices that this application is directed.

This invention will also enable a manufacturer to reduce the total number of components required to secure a roller in a mill stand for true and accurate rotation therein. Because of the reduction of mounting components required when using the invention of this application, roll replacement is simplified and inventory may be reduced.

Because the eccentricity of the work rolls is substantially reduced by the apparatus of this invention, drive fluctuation is reduced accordingly so that torque requirements for material reduction tend to be constant so as to prevent premature wear of mill stand components and other problems caused by fluctuating torque requirements due to roll eccentricity.

This invention will prevent roll slippage on the cantilevered drive shaft, and because of the effective clamping action produced by this invention, overall safety of the mill stand will be improved over prior art apparatus.

Because of the fluctuating torque requirements of a mill having one or both rolls of a matched pair rotating eccentrically, fluctuating tensions are ever present in the material passing between successive mill stands. This invention will largely reduce these tension fluctuations.

BACKGROUND OF THE INVENTION

With the advent of the tungsten carbide roll, the frequency of replacement of the rolls in a mill stand has been substantially reduced, but the mill operators constant desire for higher and higher mill speeds to generate more product for a given time causes even the most wear resistant rolls to require re-dressing in a fairly short time.

In the past, a pair of work rolls were each mechanically mounted on a robust stub shaft by means of an intermediary tapered sleeve. The sleeve is pushed into the space between the shaft and the work roll to externally expand and "lock" the work roll on the stub shaft by the tapered sleeve. Satisfactory results have caused this type of mounting to be universally accepted in the mill reducing operations.

Some operational problems can be expected to develop as the roll replacement operation occurs. One of the more significant problems resulting, is the eccentric rotation of one or both of the newly mounted rolls on the capstan drive after the mounting operation is completed. Although the mill operator has gone to great pains to assure that each capstan drive shaft is scrupulously clean, and that the polished intermediary tapered sleeves are also free of debris or other foreign material, often when the newly mounted mill rolls are rotated, they are not true, and the operator must de-mount, or twist or tap the roll to bring the eccentricity down to be within acceptable limits.

There is little doubt that skilled workmen using a variety of centering techniques with the prior art devices could ultimately reduce the roll eccentricity to an acceptable run out. The only ingredients required to produce an acceptable degree of concentricity were time and a skilled mill operator.

It is to improve the roll replacement time and reduce the work input from the mill operator to remove the eccentricity that this application is directed.

SUMMARY OF THE INVENTION

This invention provides a mounting assembly attached to the capstan of a mill which permits the mounting of a work roll thereon without the presence of an intermediary sleeve as required by the prior art. The interior of the capstan drive is a hollow cavity which is filled with a hydraulic fluid. The exterior diameter of the capstan drive shaft is only slightly less than the diameter of the roll mounted on the shaft, and once the roll is placed in its proper mounting position on the capstan shaft, the shaft is slightly "inflated" by increasing the pressure on the hydraulic fluid in the contained cavity so as to grip the roll by a constant and uniform expansion of the capstan shaft within a very limited expansion range, so that the eccentricity problems experienced by prior art mounting devices are largely eliminated.

It is an object of this invention to provide a method of mounting a work roll on a capstan drive which is rugged, swift and efficient and which mounting substantially eliminates the problem of roll eccentricity ever present in the prior art method of mounting.

The proposed method of mounting the work rolls is much swifter and more simplified than prior art techniques.

CROSS REFERENCE TO A RELATED APPLICATION

U.S. patent application Ser. No. 08/492,707—Jun. 20, 1995 entitled "Hydraulic Expanding and Contracting Mandrel"

The above pending application describes an invention where the forces applied to the mandrel shaft are substantially less than the forces applied to the cantilevered shafts associated with the instant invention. As a result of the higher forces encountered, the wall thickness of the expanding shaft are substantially increased in thickness and the working pressure of the hydraulic fluid is consequently substantially higher than the prior application.

DESCRIPTION OF THE PREFERRED EMBODIMENT

Figure 1:
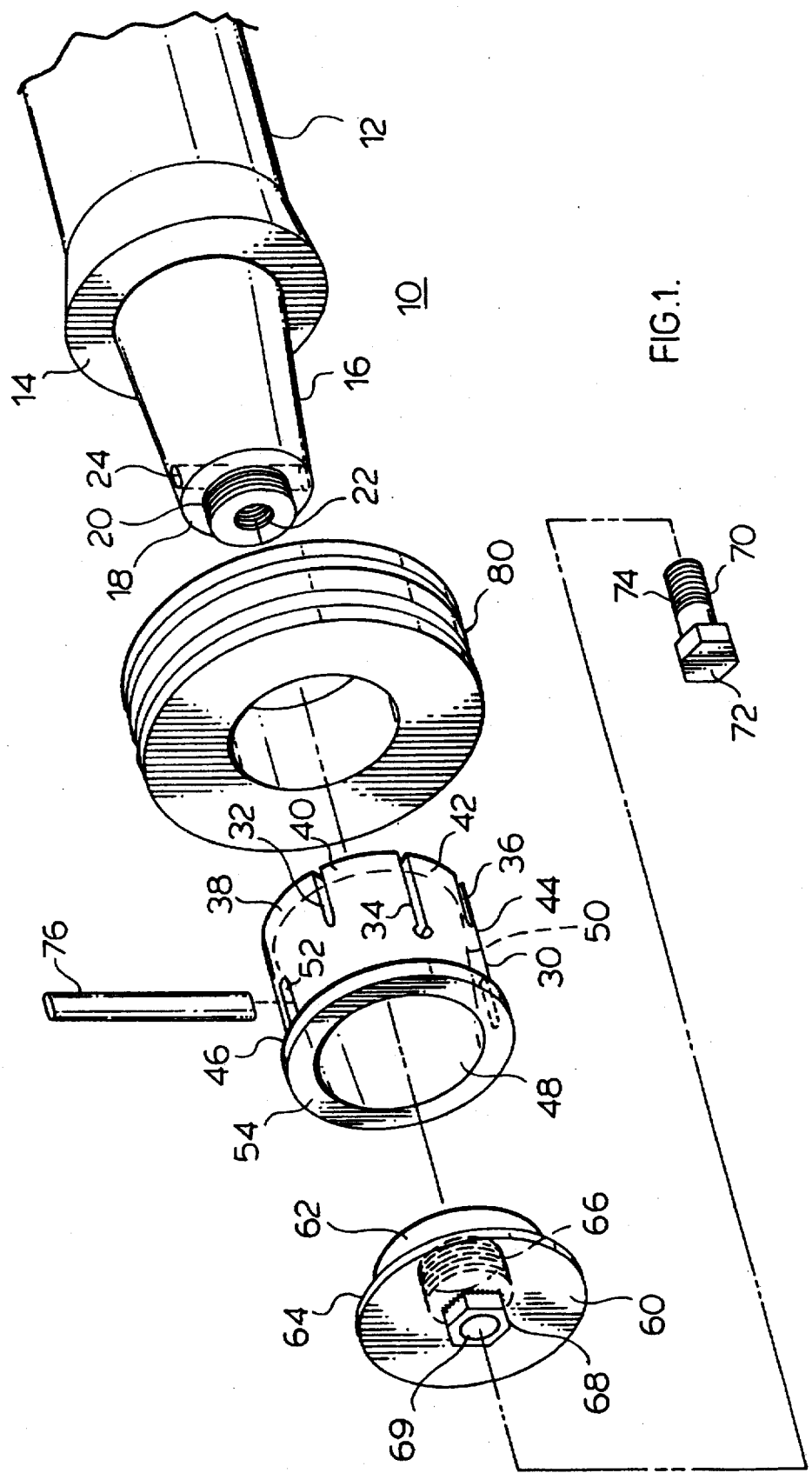
FIG. 1 is a perspective view of the prior art device used to mount work rolls on a capstan drive of a mill.

Referring to the drawings, a prior art device used for clamping a work roll to a mill capstan is illustrated. FIG. 1 shows a single cantilever device 10 which would usually have a complimentary cantilever device operatively mounted in an adjacent opposing relationship for passing a work product there between.

Device 10 comprises a robust shaft 12 (steel) which is mounted in suitable bearings for axial rotation. Shaft 12 has raised shoulder 14 arising therefrom which may be integral with the shaft, or in some cases removable therefrom (as a collar, etc.).

Shaft 12 is tapered at 16 which taper is terminated at shoulder 18, and a threaded hub 20 protrudes therefrom. A counter bore 22 in shaft 12 is threaded as shown. Shaft 12 also is provided with an elongated cross port 24 which passes completely through the shaft 12.

A taper cylinder 30 (sleeve) is provided to fit over taper surface 16 of the shaft 12. Sleeve 30 is provided with slots 32, 34, 36 to permit the intermediary portions 38, 40, 42 and 44 to easily expand when pressed over the tapered surface 16. Sleeve 30 is provided with a raised shoulder 46 and an interior cylindrical bore 48 which is joined to taper 50. Annular surface 54 joins extends between bore 48 and shoulder 46.

Sleeve 30 is provided with a pair of elongated ports 52 in opposed diametric relationship.

A pressure cap member 60 is shown for pressing sleeve 30 over tapered surface 16. Cap member has a cylindrical surface 62 which is of slightly less diameter than bore 48 of sleeve 30. Cap 60 has a shoulder 64 (to mate with surface 54) and an internally threaded counter bore 66 (to be received on threads 20). A torque nut 68 is integral with cap 60.

A bolt 70 is shown having head 72 and threads 74 (to mate with threaded counter bore 22).

Cross key 76 is shown for passage through ports 52 and cross port 24.

The assembly with a work roll 80 (shown in phantom) mounted on cantilever drive 10 is as follows:

Sleeve 30 is inserted into the interior bore of work roll 80 and both pieces, 30 and 80 are fitted over tapered surface 16. Cap 60 is now threaded onto threads 20 so that surface 54 is engaged by shoulder 64 but not pushing the tapered sleeve over the surface 16 so as to expand portions 38, 40, 42 and 44.

At this time, cross key 76 is passed through ports 52 and 24 to wedge the work roll 80 tightly against the shoulder 14.

Cap 60 is now advanced on threaded portion 20 of shaft 12 to expand the interposing finger portions 38, 40, 42 and 44 between the work roll and tapered surface 16. As the sleeve advances more radial force is exerted on the internal bore of work roll 80.

A skilled operator will tighten cap 60 to a predetermined torque so as to apply sufficient wedging force to the shaft 12, sleeve 30 and roll 80 to cause these three parts to, in fact, become in integral assembly.

Bolt 70 is now advanced in threads 22 to cause head to engage the exterior surface of torque nut 68. Aperture 69 in torque nut 68 is a clearance hole for bolt 70. Bolt 70 serves as a locking device for cap 60.

This type of assembly has functioned acceptably well in the steel industry for many years. Two complimentary capstans such as 12 are mounted in close proximity so that rolls such as 80 may simultaneously press a work product (usually steel) there between to reshape the work product to a new shape as it passes between the rolls 80. Because of the tremendous forces required to reshape the work product, the capstans are sturdy robust components mounted for rotation in heavy bearings.

The environment in which the mounting assembly as shown in FIG. 1 must operate is typical of a steel rolling mill. Coolant is applied to the work rolls and to the work product to prevent the temperature of the rolls and the mounting assembly from departing to an unacceptable operating range. Scale is ever present and is an enemy of freely machined surfaces.

Cross key 76 is wedged into post apertures 52 and 24 to wedge work roll 80 against shoulder 14 to prevent any accidental dislodgment from shoulder 14. A shimming collar (not shown) may be needed as a filler, to wedge work roll 80 in place.

Because of the presence of mill scale and other foreign debris, the sleeve shaft tapered face often gives rise to roll eccentricity when the mounting operation takes place when using the prior art device of FIG. 1. If the mounted roll does not rotate in a true fashion, the operator must release the torque on nut 68, and the force applied to cross key 76, so that work roll 80 may be re-seated on sleeve 30, by twisting the work roll or any other suitable re-seating manoeuvre. The tightening process is repeated until the eccentricity is reduced to an acceptable tolerance.

This operation is repeated for the complimentary capstan and it will be understood that at times, considerable time may elapse during the work roll replacement process, and if the two work rolls rotate eccentrically, a work product having unacceptable variations in cross section, will unfortunately result. It is to eliminate the production of a defective work product and to reduce the time taken to change rolls such as 80 that this invention is directed.

Figure 2:
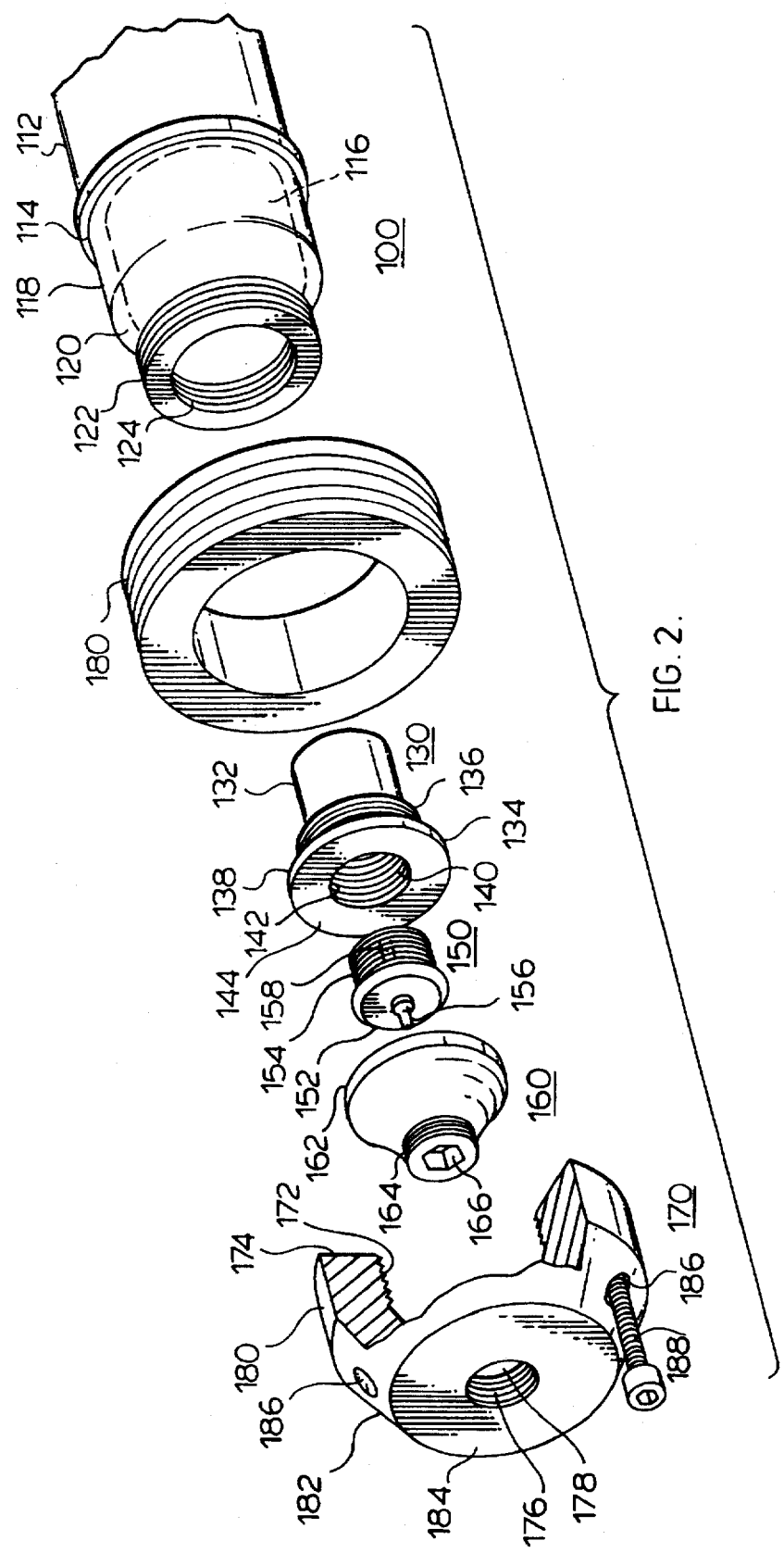
FIG. 2 is an exploded perspective view of the preferred embodiment of this invention.

The apparatus of this invention is illustrated in FIG. 2. A capstan drive assembly 100 is shown comprising a heavy shaft 112 on which a shoulder 114 is provided. Shaft 112 is also provided with a hollow cavity 116 in the interior thereof. Shaft 112 is provided with an external cylindrical surface 118 for mounting rolls such as 180.

The end of shaft 112 is slightly reduced at 120 and threaded externally at 122. An internal thread 124 is found at the interior end of shaft cavity 116.

A plug member 130 is supplied to fit into the interior threaded portion 124 of shaft cavity 116. Plug 130 is provided with a cylindrical extension 132 and an external threaded portion 136 (to fit into threaded bore 124), a flange 134 having an annular shoulder 138. An interior bore 140 is supplied with a thread 142. An annular face 144 is provided at one end of plug 130.

A plug 150 is shown having head 152 at one end thereof. An external thread 154 lies adjacent the head 152 and a pressure fitting 156 is provided in the center of head 152. Pressure fitting 156 is in communication with bore 158 for the introduction of hydraulic fluid into the cavity 116 through the fitting 156 to compress the fluid in cavity so as to expand surface 118 to engage the bore of roll 180.

A hub locking member 160 having an annular face 162 and external threaded portion 164 at one end thereof is provided to fit against surface 144 of plug 130. Hub 160 has a central bore 166 therein which is finished as a square or hexagonal interior shape to receive a drive tool.

An end bell 170 is provided to exert substantial axial pressure on the roll 180. Bell 170 is provided with an internal thread 172 (to mate with thread 122) to permit axial movement of face 174 of bell 170 to push roll 180 against shoulder 114. Another internal thread 176 is provided in bore 178 (to mate with thread 164 of hub 160).

The exterior surface of bell member is cylindrical at 180 tapered at 182 and flat at 184. A plurality of threaded holes such as 186 are located on the same diameter of bell 180 and are equidistantly spaced. Bolts such the one shown at 188 are threaded into holes 186 to generate additional axial pressure on roll 180 to ensure safe and mill worthy locking apparatus.

Assembly is as follows:

Cap 130 is threaded into shaft 112 at threads 124 to provide a seal at face 138 of cap 130. "O" rings may be required to provide adequate sealing.

Plug 150 is sealedly threaded into cap 130 into bore 140. Cavity 116 is now sealed, and must be filled completely with a suitable hydraulic fluid.

A work roll 180 is now inserted over surface 118 (no intermediary sleeve is required).

Locking device 160 is now threaded into locking bell 170 at bore 178 from the inside of bell 160. Bell 170 is now mounted on shaft 112 on threads 122 which mate with interior threaded surface 172 in bell 170 so as to engage and press work roll 180 against shoulder 114 as bell 170 is advanced on threads 122. Bell 170 is tightened to a predetermined torque at which time hydraulic fluid is introduced into chamber 116 via pressure fitting 156 to expand surface 118. When a predetermined pressure has been attained in the cavity 116, a wrench is inserted into socket aperture 166 of locking device 160 to cause it to turn and move out of bell 160 toward surface 144 of cap 130.

When surface 162 of locking device 160 engages surface 144 of cap 130, the torque is increased on member 160 to a predetermined value to lock bell 170 on shaft 112.

If further locking of roll 180 is required, bolts 188 may be advanced in receptacles 186 to the point where the threaded ends of bolts 178 engage the work roll 180 and torqued to a predetermined specification to apply additional side pressure on work roll 180.

Because of the method of mounting the work roll on shaft 112, there is equal radial expansion of hub surface 118 to ensure that roll 180 is concentrically mounted on the shaft 112.

Figure 3:
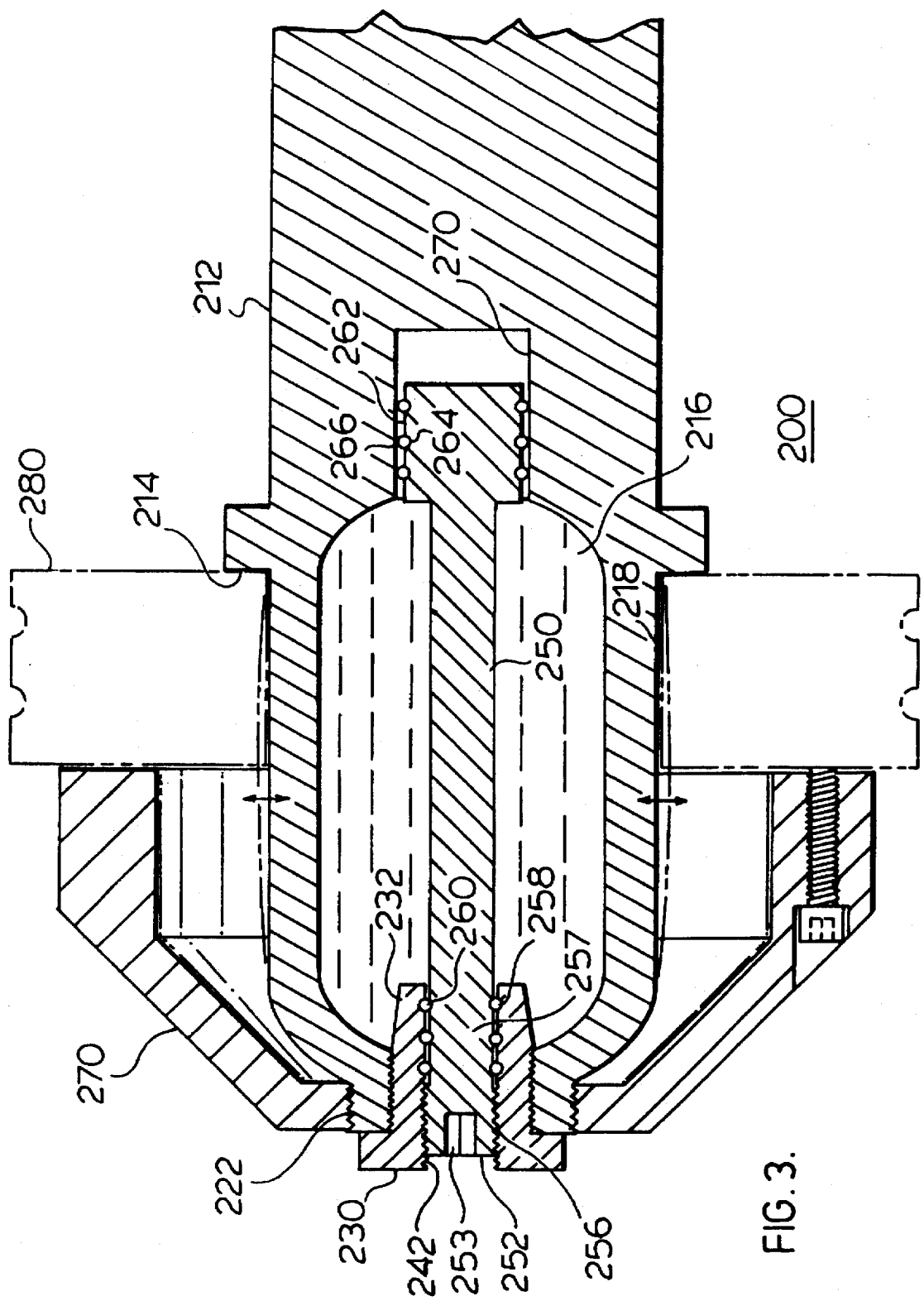
FIG. 3 is a partial sectional view of an alternative form of this invention.

FIG. 3 shows an alternative construction of the clamping device of this invention.

In this instance, a shaft 212 is provided with a cavity 216 to expand surface 218. A plug 230 encloses the cavity as previously, except plug 230 has a cylindrical extension 232.

An elongated bolt 250 is provided with a head 252 having a hexagonal recess 253 formed therein at one end thereof. A threaded portion 256 is provided for mating with thread 242 in plug 230.

A plurality of circular grooves 258 are provided in bolt 250 adjacent threads 256 for receiving "o" rings 260. At the remote end of bolt 250 is an enlarged cylindrical portion 262. Portion 262 has a plurality of circular grooves 264 provided for receiving "o" rings 266.

Bolt 250 is threaded into plug 230 so that the pressure in cavity 216 may be altered by the axial movement of bolt 250. "O" rings 260 and 266 surround two piston sections of differing diameters. Piston section 257 is sealed in cylinder 232, and piston 262 is sealed in bore 270 of shaft 212.

A hexagonal driving tool is inserted into head 254 in hexagonal receptacle 253 to twist bolt 250 into or out of the plug 230. Advancing bolt 250 into plug 230 decreases the pressure inside the cavity and vice versa.

Figure 4:
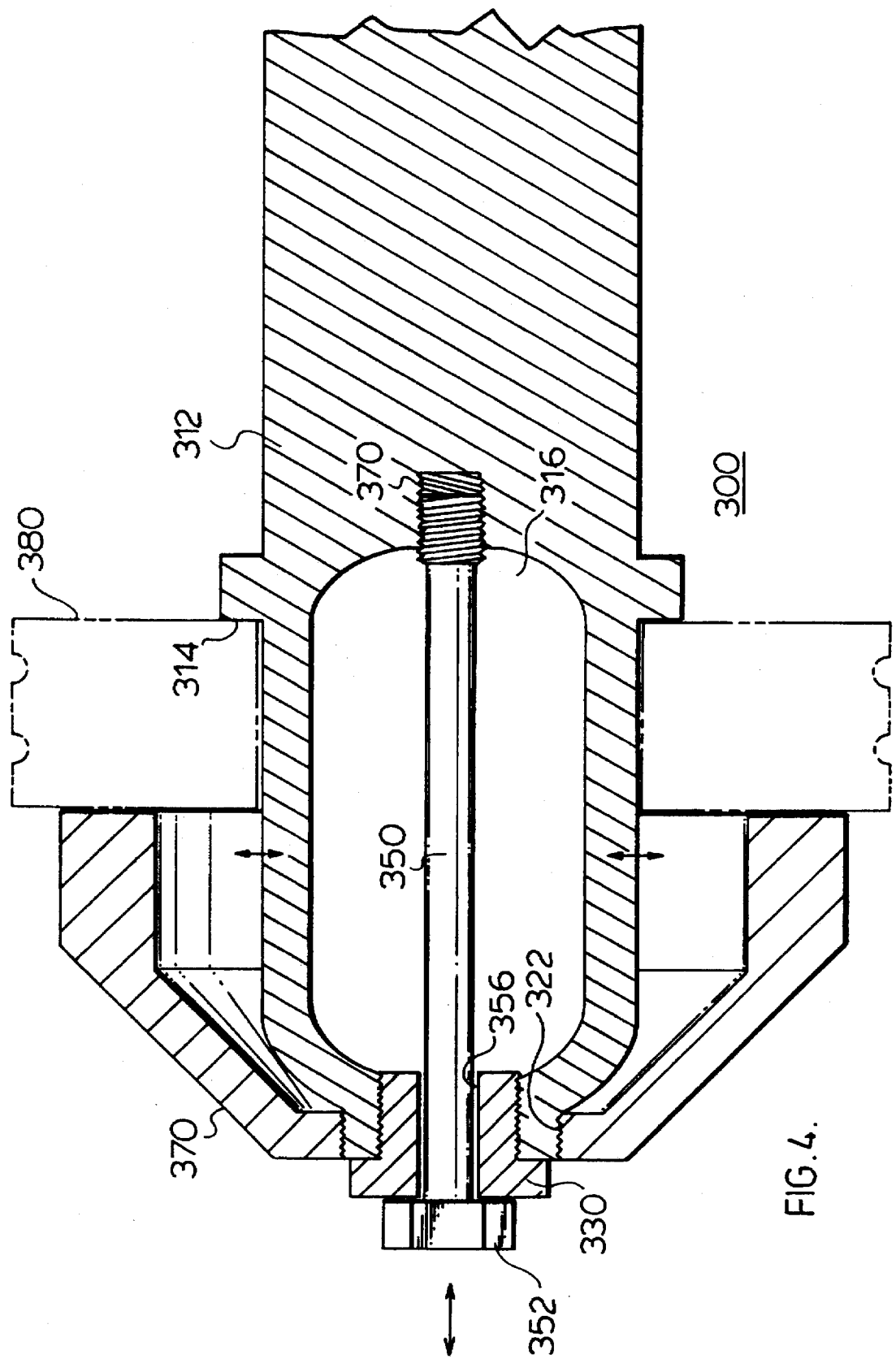
FIG. 4 is a partial sectional view of another form of this invention.

FIG. 4 shows another alternative construction for the tool 300 of this invention. Shaft 312 Contains a cavity 316 which is closed by plug 330.

Bolt 350 having head 352 passes through clearance bore 356 in plug 330 and into threaded bore 370 of shaft 312. As previously, when bolt 350 is tightened, the walls of cylinder 320 compress and bulge outwardly to engage the internal bore of work roll 380. A bell such as bell 170 shown in FIG. 2 may be mounted on threaded portion 322 to press the work roll 380 against shoulder 314.

Figure 5:
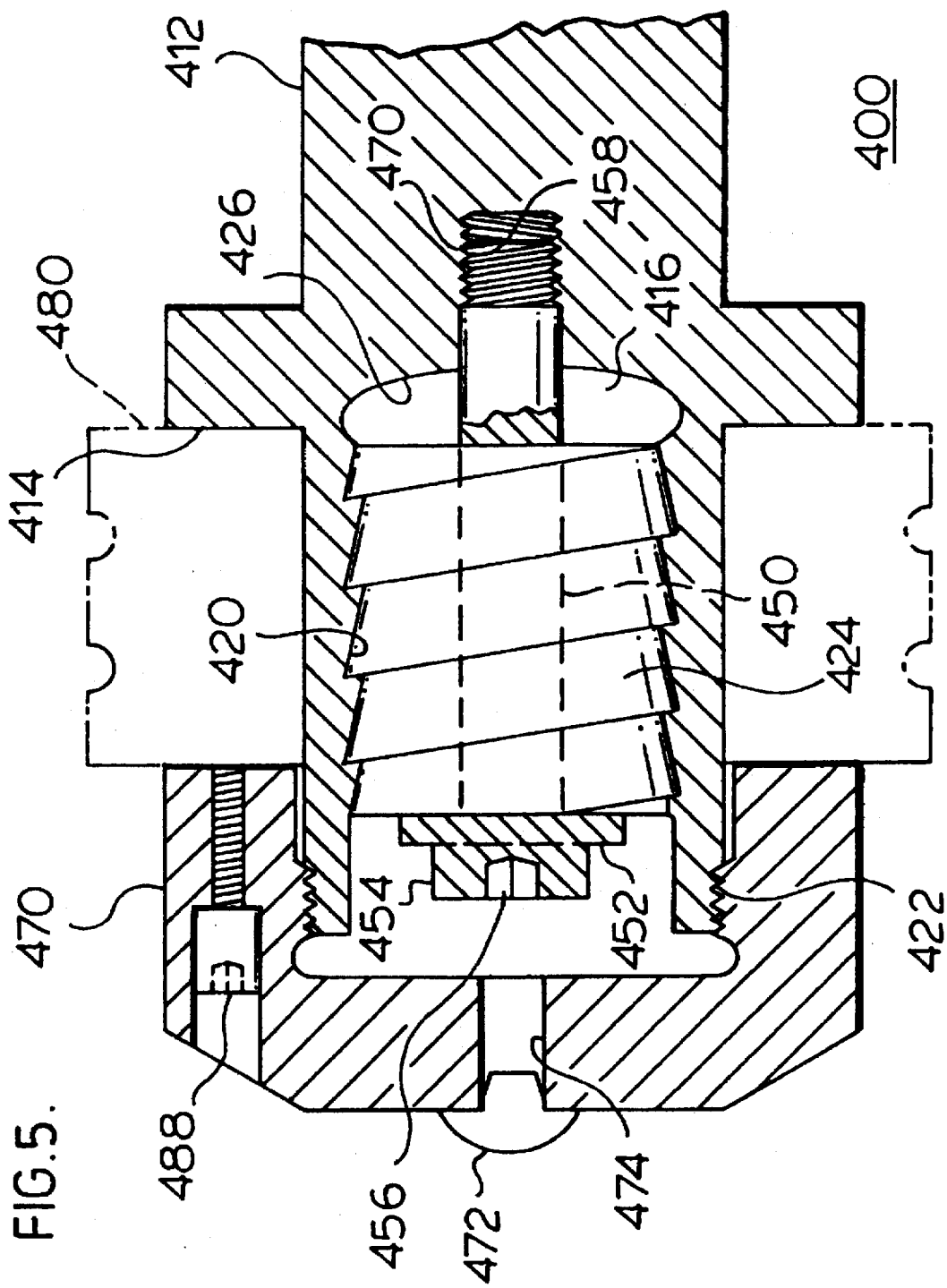
FIG. 5 is a partial sectional view of another form of this invention.

FIG. 5 illustrates another embodiment of applicant's invention. Here, a roll clamping arrangement 400 is shown having cantilevered drive shaft 412 provided with abutment 414 against which roll 480 is located.

A cavity 416 in the end of shaft 412 is threaded as shown with a buttress type thread which has a very shallow slope on the slanting portion of the thread. Cavity 416 is supplied with a threaded axial bore at 470 for the reception of bolt 450.

As previously, shaft 412 is threaded at 422 to permit locking bell 470 to be advanced along the threads to clamp roll 480 against shoulder 414. Bolts 488 in bell 470 may provide the ultimate force on roll 480 to permit the transmission of drive torque from shaft 412 to roll 480.

The system 400 functions as follows:

Roll 480 is slid on shaft 412 until it engages shoulder 414. At this time, plug 424 is screwed into cavity 416 of shaft 412. It is imperative that plug 424 does not engage the end wall of the cavity 416 (for reasons which become obvious later) but is stopped just short of the end wall 426.

Next bolt 450 is passed through the central bore 418 of plug 424 which is a clearance fit and bolt 450 is advanced into threaded bore 470 just sufficiently to have head 454 and thrust shoulder 452 engage the end of plug 424.

At this time, end bell 470 is screwed onto shaft 412 at threads 422 to engage roll 480 and lock it against shoulder 414. At this time, bolt 450 is tightened to force plug 424 toward the end 426 of cavity 416 to expand the shaft 412 in the region beneath roll 480. By forcing the plug to move laterally, the ramps on the buttress threads on plug 424 are pushed against the corresponding ramps on the threads provided in cavity 416 to expand the shaft. Because of the shallow slope (in this instance 2.49°) and a relatively long length i.e. 12 mm for the sloping surface a large expanding force can be developed by tightening bolt 450 against plug 424. When shaft 412 has been expanded sufficiently, bolts 488 may be tightened against roll 480 to provide the final locking force for roll 480. Plug 472 may now be inserted into end bell 470 to prevent the entrance of debris from the operation of the mill stand of which shaft 412 is a part.

All the above constructions of the applicant's invention dispense with an intermediary sleeve such as sleeve 30 shown in FIG. 1. The wedging action is therefore avoided and the resulting eccentricity problems are avoided. The changing of the work rolls is much less complicated and much less time consuming than prior art constructions.

I claim:

1. A cantilevered drive shaft for a rolling mill comprising a shaft having suitable means to drive said shaft about its axis from one end thereof, said shaft being mounted in suitable bearings for rotation therein, said shaft housing a hollow closed cylinder in the end of said shaft opposite said drive means, said closed cylinder having walls of a predetermined thickness, said shaft having an exterior raised abutment adjacent one end of said cylinder, said shaft having access means in the end thereof for communication with said closed cylinder housed in the end of said shaft, shaft expanding means housed in said cylinder.

2. A cantilevered drive shaft for a rolling mill as claimed in claim 1 wherein said closed cylinder is filled with a suitable hydraulic fluid, and said access means in the end of said shaft comprises a high pressure hydraulic fitting for pressurizing the fluid in said closed cylinder to provide shaft expanding means, said shaft being capable of receiving a mill roll thereon directly over said cylinder and being engagable by said raised abutment, locking means being mounted on said shaft, capable of engaging and locking said mill roll on said shaft between said locking means and said abutment.

3. A cantilevered drive as claimed in claim 2 wherein said access means is engagable by fluid pump means external to said cylinder to pressurize the interior cavity of said hollow cylinder to provide shaft expanding means.

4. A cantilevered drive as claimed in claim 2 wherein said access means includes piston means accessible from the exterior of said closed cylinder which may be actuated externally to move in an axial direction within said closed cylinder to pressurize and depressurize the fluid in said closed cylinder.

5. A cantilevered drive as claimed in claims 3 wherein said abutment comprises an annular surface and said locking means includes a bell shaped member threaded onto said shaft for engagement of said mill roll on a side remote from said annular surface.

6. A cantilevered drive shaft as claimed in claim 1 wherein said access means includes an aperture for bolt means passing through in the central axis of said shaft and closed cylinder, said bolt means being capable of exerting an axial compressive force on said fitting and the walls of said cylinder to cause radial expansion of said closed cylinder.

7. A cantilevered drive shaft as claimed in claim 6 wherein a mill roll is mounted on said shaft over said closed cylinder and a locking means is threaded onto said shaft on suitable threads carried at the end of said shaft adjacent said access means for engaging and locking said mill roll between said abutment and said locking means.

8. A cantilevered drive shaft as claimed in claim 1 wherein said expanding means comprises plug means fitted into said closed cylinder, said plug means and closed cylinder being threadedly engaged, each having matching buttress type threads having a very shallow pitch to the sloping surface, means for imparting lateral movement to said plug means to ramp said buttress threads of said plug means against the corresponding threads of said closed cylinder to expand said closed cylinder.

9. A cantilevered drive shaft as claimed in claim 8 wherein said plug has a clearance hole passing through the central axis thereof, bolt means passing through said hole and threadably engaging said shaft at the end of said closed cylinder remote from said access means, said bolt means being capable of imparting relative lateral movement of said plug means with respect to said closed cylinder, to expand said closed cylinder.

10. A cantilevered drive shaft as claimed in claim 9 wherein a mill roll is mounted on said shaft over said cylinder, and a locking device is threaded onto the end of said shaft on suitable threads carried on the external end of said shaft adjacent said access means, said locking means engaging said mill roll and forcing said mill roll against said abutment.

* * * * *